United States Patent [19]

Hammel et al.

[11] 3,972,720

[45] Aug. 3, 1976

[54] PHASE SEPARATABLE BOROSILICATE GLASS COMPOSITIONS

[75] Inventors: Joseph J. Hammel; Ties Allersma, both of Pittsburgh, Pa.

[73] Assignee: PPG Industries, Inc., Pittsburgh, Pa.

[22] Filed: Mar. 26, 1975

[21] Appl. No.: 562,064

Related U.S. Application Data

[60] Division of Ser. No. 447,199, March 1, 1974, Pat. No. 3,923,533, which is a continuation-in-part of Ser. No. 311,191, Dec. 1, 1972, Pat. No. 3,843,341, which is a continuation-in-part of Ser. Nos. 231,346, March 2, 1972, abandoned, and Ser. No. 264,081, June 19, 1972, abandoned.

[52] U.S. Cl.................................. 106/54; 252/432
[51] Int. Cl.$^2$..................... C03C 3/08; C03C 3/04; C03C 3/30
[58] Field of Search ...................................... 106/54

[56] References Cited
UNITED STATES PATENTS

| | | | |
|---|---|---|---|
| 2,382,056 | 8/1945 | Hood | 106/54 |
| 3,171,750 | 3/1965 | Bennett et al. | 106/54 |
| 3,671,380 | 6/1972 | Ali et al. | 106/54 |

OTHER PUBLICATIONS

Morey, G. W., *The Properties of Glass*, Second Edition, Reinhold Publishing Corp., 1954, p. 235.

*Primary Examiner*—Patrick P. Garvin
*Assistant Examiner*—Mark Bell
*Attorney, Agent, or Firm*—Dennis G. Millman; William J. Uhl

[57] ABSTRACT

Thermally stable, mechanically strong microporous glass articles with large pore volumes, surface areas, and varying pore sizes, and methods for making such articles are disclosed. In particle form, such as beads, the microporous glass articles are useful as catalyst supports in applications such as petroleum catalytic refiners, chemical processes and motor vehicle catalytic mufflers. The mechanical strength and the dimensional stability of the microporous glass articles at elevated temperatures can be improved if the articles are preshrunk, such as by brief exposure to high temperatures, before their intended use, and can be improved even further if treated with certain metal oxides.

1 Claim, 5 Drawing Figures

PHASE SEPARATABLE BOROSILICATE GLASS COMPOSITIONS

CROSS REFERENCE TO RELATED APPLICATIONS

This application is a division of U.S. Pat. application Ser. No. 447,199, filed Mar. 1, 1974, now U.S. Pat. No. 3,923,533, which is a continuation-in-part of U.S. Pat. application Ser. No. 311,191, filed Dec. 1, 1972, now U.S. Pat. No. 3,843,341, which in turn in a continuation-in-part of the following U.S. applications: Ser. No. 231,346, filed Mar. 2, 1972, now abandoned, and Ser. No. 264,081, filed June 19, 1972, now abandoned.

BACKGROUND OF THE INVENTION

1. Field of the Invention

This invention relates to high porosity glass articles, particularly microporous glass beads, having high crush strength and high thermal stability. This invention also relates to methods for making, as well as to glass compositions particularly suited to the methods of making such articles. In a particular aspect, this invention relates to a method of improving even further the crush strength and the dimensional stability of the porous glass articles at elevated temperatures.

2. Brief Description of the Prior Art

It is well known in the art to make a porous glass article by heat treating the glass to cause phase separation and then leaching the glass to extract the soluble phase. Such a procedure is disclosed in U.S. Pat. Nos. 2,106,744 and 2,221,709, both to Hood et al., which describe a method of making porous glass from an alkali-borosilicate glass by heat treatment of the glass to separate it into two phases, one of which is an insoluble phase being rich in silica, and the other is a soluble phase being rich in boric oxide and in alkali. The borate-rich phase is soluble in acid and may be leached out leaving the insoluble phase as a rigid cellular structure which maintains the shape of the initial glass. These porous silica structures have been suggested for use as catalyst supports. Other references which disclose the use of various porous glasses for use as catalyst supports are U.S. Pat. Nos. 2,461,841 to Nordberg; 2,480,672 to Plank; 2,834,738 to Vincent and 2,835,367 to Dowden et al. Unfortunately, this utility is somewhat limited by the fact that porous glass structures up until the time of this invention have not been made with high pore volumes, mechanical strengths and thermal stabilities. For high catalytic activity, high pore volumes are desirable. For applications such as fluid catalyst beds and motor vehicle catalytic mufflers, poor mechanical strength and shrinkage of the catalyst support due to high temperature exposure is undesirable.

SUMMARY OF THE INVENTION

In accordance with this invention, there is provided a method for making porous glass articles, particularly beads, with enhanced crush strength and dimensional stability at elevated temperatures. The method involves phase separating a low silica-high borate containing glass having the following composition:

| Component | Percent by Weight | | |
|---|---|---|---|
| | Broad Range | Preferred Range | Most Preferred Range |
| $SiO_2$ | 30 – 50 | 38 – 46 | 38 – 42 |
| $B_2O_3$ | 40 – 55 | 40 – 52 | 49 – 52 |
| $R_2O$ (where R = alkali metal) | 5 – 15 | 8 – 12 | 8 – 10 |
| $Al_2O_3$ | 0 – 4 | 0 – 0.3 | 0 – 0.3 | into a silica-rich and a borate-rich phase. The phase-separated glass is then leached with water to remove slowly a sufficient quantity of the borate-rich phase to form a porous glass. The porous glass is then leached with an aqueous solution of acid to remove alkali and borate from the silica skeleton, to form a low alkali and borate microporous glass structure. After the acid leach, the porous glass is washed with deionized water to remove acid and any soluble phase remaining in the pores.

The crush strength and dimensional stability of the porous glass articles at elevated temperatures can be improved if the articles are slightly preshrunk before their intended use, e.g., for use as a catalyst support. The preshrinking operation can be accomplished by briefly exposing the porous glass particles to or slightly in excess of the maximum use temperature. For example, a ½ to 5-hour exposure to a temperature of 400°–1100°C. has been found to be satisfactory. When the porous glass articles of the invention are heated in such a fashion, the volume shrinkage amounts to about 5 to 20 percent of the original bead volume, and surprisingly, at a given temperature, most of the total observed shrinkage, i.e., 70 to 90 percent, occurs during the first two hours or so of heat treatment. Since continued exposure to the elevated temperature results in only minimal additional shrinkage, the preshrunk porous glass beads can be used in a catalytic muffler application with considerable assurance that additional shrinkage will not occur.

The dimensional stability of the porous glass articles at elevated temperatures can be improved even further if the porous glass is treated with tin oxide.

The porous glass articles of the invention have the following analyzed composition:

| Component | Percent by Weight | |
|---|---|---|
| | Broad Range | Preferred Range |
| $SiO_2$ | at least 96 | 97 – 99 |
| $B_2O_3$ | less than 4 | 1 – 3 |
| alkali metal oxide | less than 0.05 | 0 – 0.03 |
| $Al_2O_3$ | less than 0.4 | 0 – 0.15 |

For applications where dimensional stability at elevated temperatures and high crush strength are required, such as motor vehicle catalytic mufflers, porous glass beads can be made in accordance with the invention, such that when the porous bead is subjected to a temperature of 980°C. for 24 hours, it undergoes less than 25 percent volume shrinkage and loses less than 30 percent of its surface area. The crush strength of such articles is at least 20 pounds per square inch gauge.

For applications where high pore volume and high pore diameter are required, the porous glass articles of the invention can be made with pore volumes between 0.5 to 0.7 cubic centimeters per gram and average pore diameters of from 200 to 1000 Angstrom units. The crush strength of such articles is about 5 to 10 pounds per square inch gauge, and the dimensional stability of these high porosity articles is such that when they are subjected to a temperature of 760°C. for 24 hours, they undergo about 10 to 20 percent volume shrinkage.

Also, by carefully controlling initial glass composition and phase separating conditions, large pore diameter beads can be produced with enhanced crush strength and thermal stability, that is, the beads will have crush strengths of at least 15 and usually between 20 and 40 pounds per square inch gauge and undergo less than 25 percent volume shrinkage when exposed to 980°C. for 24 hours.

DETAILED DESCRIPTION

Figure 1:
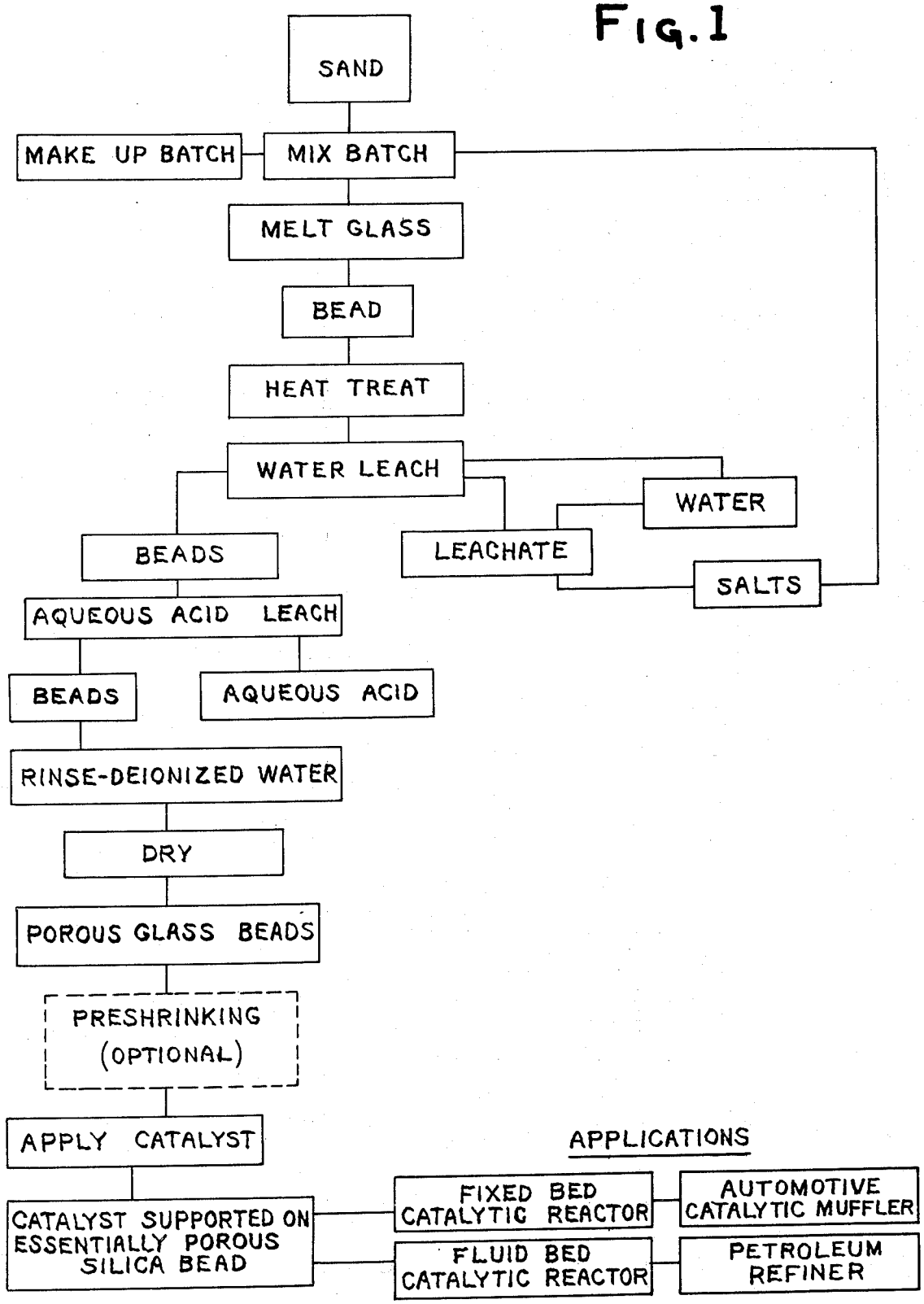
FIG. 1 is a flow sheet depicting an overall process for making a porous glass bead product according to the invention.

Referring to FIG. 1, an overall view of the invention is seen. The borosilicate glasses useful in this invention may be melted according to methods well known in the industry. Usually powdered raw materials containing sand, boric oxide, alkali metal oxides and, optionally, alumina are first batched, and then mixed and melted together. While it is preferred that the raw materials be present in forms which, when mixed and heated, most readily fuse to form a melt, the oxides may be present either in the free state or in the form of other suitable compounds. Examples of suitable compounds are alkali metal carbonates, borates and aluminates.

A glass having a composition prior to phase separation and leaching within the following limits is particularly suitable for use in the practice of this invention.

| | Percent by Weight | | |
|---|---|---|---|
| Ingredient | Broad Range | Preferred Range | Most Preferred Range |
| $SiO_2$ | 30 – 50 | 38 – 46 | 38 – 42 |
| $B_2O_3$ | 40 – 55 | 40 – 52 | 49 – 52 |
| $R_2O$ (where R = alkali metal) | 5 – 15 | 8 – 12 | 8 – 10 |
| $Al_2O_3$ | 0 – 4 | 0 – 0.3 | 0 – 0.3 |

Silica forms the insoluble phase when the glass is phase separated and is the principal component in the glass skeleton in the resultant porous article of the invention. The silica content of the glass composition should not exceed 50 percent because the pore volumes will be too low for the porous glass to be effective as a catalyst support. Also, too high a silica content makes it difficult to remove the borate and alkali metal oxide from the silica skeleton in the acid leach. This results in lowering of the thermal stability of the catalyst support as measured by the shrinkage of the article or measured by the loss of surface area due to a prolonged exposure to elevated temperatures, e.g., a 16 to 24-hour exposure at 850°-980°C. For high pore volumes, the silica content of the glass composition should be low, preferably about 38 to 45 percent, although the silica content should not be below 30 percent by weight because such glass compositions, upon phase separation and leaching, yield porous glass structures which have relatively poor mechanical strength (crush strength).

The $B_2O_3$ content is somewhat related to the $SiO_2$ content and in general, as the $SiO_2$ content decreases, the $B_2O_3$ content in the glass composition will increase. Preferably, the $SiO_2/B_2O_3$ content is within the range of 1:1 to 1:1.3. The $B_2O_3$ content should not exceed 55 percent by weight of the glass composition since the resultant microporous glass structure will have relatively poor crush strength. Also, the $B_2O_3$ content should not be below 40 percent because such glasses are not readily leached with water and have too low pore volumes to be effective catalyst supports giving resultant high catalyst activity. In general, a lower $SiO_2/B_2O_3$ ratio provides for a higher surface area and pore volume.

The alkali metal oxide is present as a flux to reduce the melting temperature of the glass. Lithium oxide, sodium oxide and potassium oxide, singly, or mixtures of any two or three may be employed, but sodium oxide is preferred. If the glass composition contains a lower portion of the alkali metal oxide as specified above, the fusion temperature of the glass may be too high for economical manufacture.

The alkali metal oxide content is also related to the mechanical strength of the resultant porous glass article. It has been found that either too high or too low an alkali metal oxide content results in a porous glass article with poor mechanical strength. Although not intended to be bound by any theory, it is believed that the alkali metal oxide plays an important part in phase separation and leaching. When present in the ranges set forth above, particularly within the preferred ranges, the alkali metal oxide is believed to make the mutually incompatible borate and silica phases somewhat more soluble in one another during the phase separation heat treatment. As a result, the coefficients of thermal expansion of the borate and the silica phases are somewhat closer together than if there were a more complete separation of the phases. Therefore, when the glass is cooled down after a phase-separating heat treatment, the difference in shrinkage between the borate phase and the silica phase is not nearly as great as it would be if there were a more complete separation. This reduces the shrinkage of the silica skeleton during the initial leach and minimizes the tendency towards stress cracking and mechanically weak beads.

On the other hand, when the alkali metal oxide content is too high, the silica and the borate phases become too soluble in one another during the heat treatment and as a result, when the borate phase is leached away from the silica skeleton, there is too much silica in the borate phase resulting in a skeleton which is mechanically weak and is easily crushed.

The following embodiment of the invention shows the effect of alkali metal oxide content on the crush strength of porous glass beads. The beads are prepared as generally described in Example 1 infra.

| Composition: | SiO$_2$ | 40 | 45 | 46 | 48 |
|---|---|---|---|---|---|
| | B$_2$O$_3$ | 40 | 44 | 46 | 48 |
| | Na$_2$O | 20 | 11 | 8 | 4 |
| Crush Strength (psig) | | 0* | 19 | 22 | 0** |

*Bead after leaching crumbled.
**Beads had numerous fine cracks in surface.

As has been mentioned, one of the principal functions of the alkali metal oxide is to flux the glass melt, reducing the melting temperature. It should be clear that other fluxing agents well known in the art of melting and forming glass could also be used and are considered to be equivalent to the alkali metal oxides and within the scope of the glass compositions of the invention. Examples of suitable fluxing metal oxides, other than the alkali metal oxides which could be used in the practice of this invention include the alkaline earth metal oxides, particularly calcium and magnesium oxides and other metal oxides such as BaO, PbO, CdO, SnO and ZnO. The alkali metal oxides are clearly preferred, however, due to their excellent fluxing ability and their ease in leaching from the silica skeleton.

Figure 2:
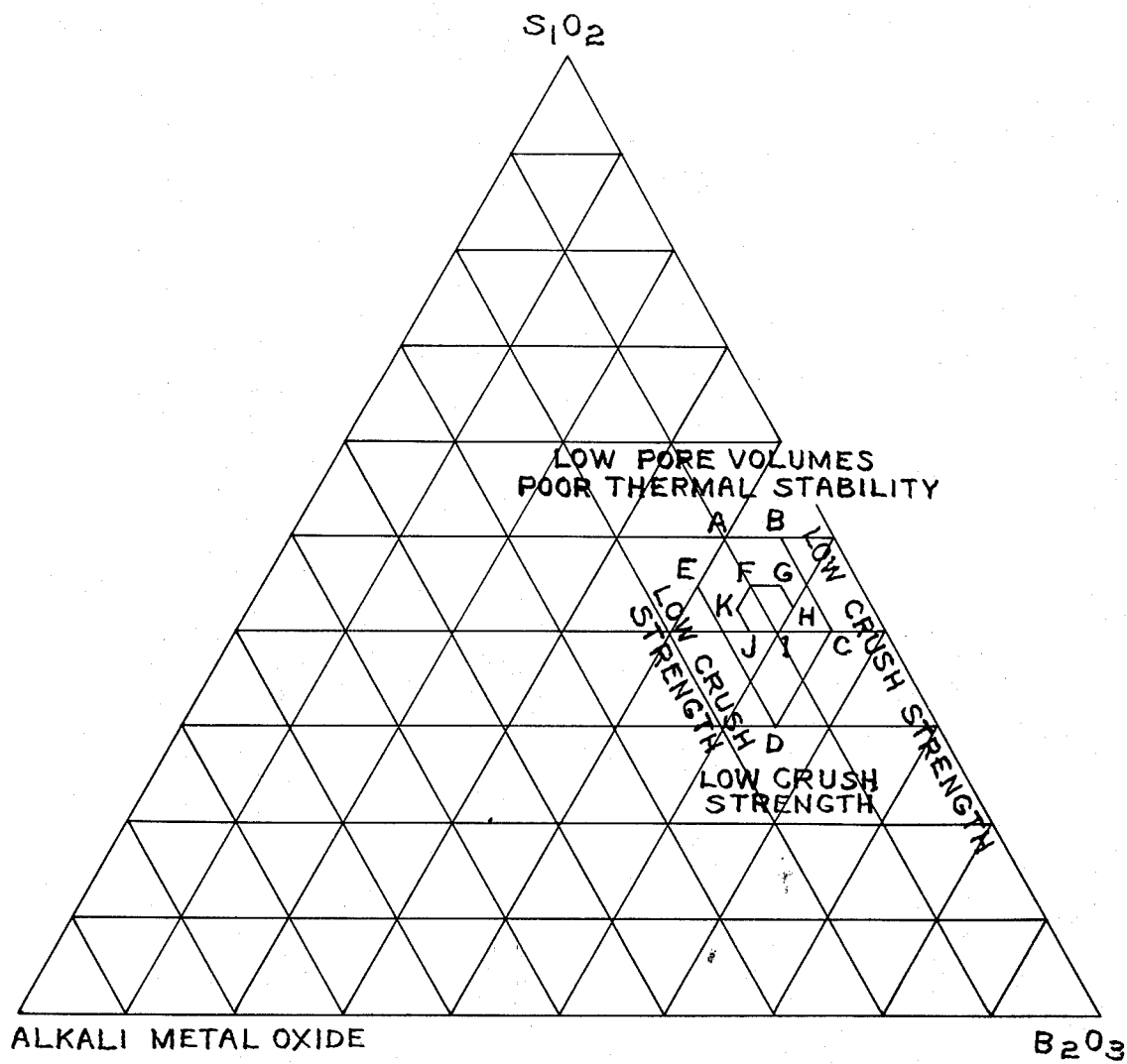
FIG. 2 is a graph plotted on triangular coordinates showing the relative proportions of $SiO_2$, $B_2O_3$ and alkali metal oxide which must be used to prepare the microporous glass articles of the invention.

FIG. 2 gives an idea of the relative proportion of SiO$_2$, B$_2$O$_3$ and alkali metal oxide in the glass compositions of the invention. The area inside the pentagon A B C D E represents the broader compositional ranges of the invention, and the area inside the hexagon F G H I J K represents the preferred glass composition of the invention.

Optionally, alumina, up to 4 percent by weight, can be introduced into the glass compositions. It is believed that the incorporation of alumina into a high-silica, low borate-containing glass (e.g., about 46–50 percent SiO$_2$, 35–40 percent B$_2$O$_3$) minimizes the danger of stress cracking of the silica skeleton during leaching. By stress cracking is meant that the outer or leached portion of the bead goes into tension due to shrinkage of the silica-rich skeleton, and the inner or unleached portion goes into compression. If the tension becomes too high and/or micro-flaws are present, cracks originating at the surface will develop. Alumina slows phase separation and produces smaller pores and therefore less concentration of stresses. This lowers the probability of producing a microcrack which will propagate under tension to a macrocrack. Also, the incorporation of alumina into the glass compositions results in porous glass articles with increased surface area. However, these high surface area glasses also suffer the greatest loss of surface area when the porous glasses are exposed to high temperatures. With the preferred glass compositions, containing about 38–46 percent by weight SiO$_2$ and 40–52 percent by weight B$_2$O$_3$, alumina shows no particular advantage and is preferably excluded. In any event, greater than about 4 percent by weight alumina should not be used because glasses containing such high alumina contents are, in general, difficult to phase separate and to leach.

Usually in an analysis of the glass composition of the invention, about 0.15 to 0.3 percent Al$_2$O$_3$ shows up. This is believed to be due to an alumina impurity in the silica. Thus, a calculated analysis will show no Al$_2$O$_3$; an actual wet chemical analysis of the composition will show on occasion up to 0.3 percent Al$_2$O$_3$.

After a glass of the above composition has been melted, the glass is particulated. Particulation can be achieved directly from the glass melt as described in U.S. Pat. application Ser. No. 356,971, filed May 3, 1973, to E. J. Cone or can be achieved by first forming the glass into a shape-retaining article and then mechanically breaking it. Particle size can be controlled by crushing or grinding, followed by sieving the particles through standard mesh screens. Alternately, the glass can be particulated by directly quenching the glass melt with a suitable fluid. Examples of suitable fluids include air and liquids, such as water and oils. If the glass particles are formed directly from the glass melt as described above, they are usually in bead form and no further shaping is necessary. However, if glass is particulated by mechanically breaking or direct quenching of the melt, further shaping or beading is necessary.

The beading operation consists of passing the irregularly shaped particles through an inclined rotating alumina-lined tube furnace to spheroidize the particles putting them into bead form which is the most usable form for a catalyst support. The center portion of the tube furnace is at a temperature of about 925°–1100°C. To prevent sticking to the alumina tube, the particles can be mixed with boron nitride or carbon black. For example, one part by weight of boron nitride to 74 parts by weight of glass will prevent sticking.

The bead size preferred for a porous catalyst support will vary depending upon the use to which the catalyst is to be applied. For example, a fluid bed catalyst support should have an approximate bead size diameter of from 0.10 to 0.30 millimeter (mm), a fixed bed catalyst should have a bead size diameter of approximately 1 to 2 mm, and catalyst support for use in a motor vehicle catalytic muffler should have a bead size diameter of from about 2 to 4 mm. In general, it has been found the particles having a bead size diameter from about 0.05 to 5.0 mm are easily obtainable.

After the beads have been sized, they are phase separated. Phase separation can be carried out by heating the glass beads to a temperature of from about 400°–700°C. for a period of from 1 to 64 hours. The heat treatment, if properly carried out, will cause the glass to become more or less completely separated into two distinct phases, one of which is very rich in boric oxide and alkali and is soluble in water and acids, and the other phase is very rich in silica and in insoluble in water and acids (excluding, of course, hydrofluoric acid). The glass at this stage of the process may be characterized in most cases by a bluish opalescence, due to the separation of the phases.

In carrying out the heat treatment, the viscosities and the volume fractions of the two separating phases are such that separation does not take place in the usual form of an emulsion or system of droplets dispersed in a second phase, but separation into a continuous thread-like structure of the soluble phase embedded in the insoluble phase occurs. The soluble phase, being of a continuous nature, can be entirely removed from the insoluble phase. When this is done, a rigid, porous structure of the original glass shape is left after the soluble phase is leached out.

The temperature and time for phase separation will depend principally on the pore size diameter and pore size distribution desired in the article. For example, in the heat treatment of porous glass beads, low temperature and short heat treatment times (e.g., 420°–500°C.

for 1 to 8 hours) will produce beads with average pore diameters in the 50 to 200 Angstrom range. These beads if properly leached and post treated will have excellent thermal stability and crush strength, making them particularly useful for catalytic mufflers. Longer times and higher temperatures (e.g., 8 to 24 hours at 580°–650°C) will produce pores in the 200 to 1000 Angstrom range. It is possible by carefully controlling the water leaching conditions as discussed below to obtain reasonably strong and thermally stable beads in the 600 to 1000 Angstrom range. Such beads are weaker than the beads with smaller pores and do not have the thermal stability. The crush strength of large pore diameter beads are on the order of 5 to 20 psig and the thermal stabilities are such that when the beads are exposed to 760°C. for 24 hours, they undergo about a 10 to 20 percent volume shrinkage. Such beads are very useful, however, in applications where high thermal stability and crush strength are not required, for example, for use in crude oil refiners and low temperature fixed catalytic beds. In general, however, heat treating at a temperature higher than 700°C. is undesirable because of the tendency of the two phases to become miscible at these high temperatures, and the tendency of the glass beads to form stress cracks on leaching and to be thermally unstable, both excessively shrinking and losing a significant amount of surface area by prolonged exposure to elevated temperatures.

It has been found that with the most preferred glass compositions, the heat treatment conditions can be varied to produce phase separations in beads such that controlled pore diameters and optimum strength and thermal stability are obtained. For beads having pore diameters in the range of 50 to 200 Angstroms, the preferred heat treatment comprises heating the beads at a temperature of about 460°–500°C. for about 2 to 6 hours, cooling uniformly over a period of about 1–3 hours to a temperature of about 400°–420°C. and then cooling slowly or rapidly to room temperature, that is, cooling over a period of about 1 to 16 hours. This particular heat treatment when coupled with a most preferred range of initial glass composition, that is, one having a composition of 38 to 42 percent by weight $SiO_2$, 49 to 52 percent by weight $B_2O_3$ and 9 to 10 percent by weight $Na_2O$ provides for beads in the above pore diameter range having the greatest strength and thermal stabilities. For example, such beads have crush strengths of at least 20 pounds per square inch gauge and undergo less than a 25 percent volume shrinkage and lose less than 30 percent of their surface area when the article is subjected to a temperature of 980°C. for 24 hours.

For beads having pore diameters in the range of 600–1000 Angstrom units, the preferred heat treatment comprises heating the beads to a temperature of about 560° to 600°C. for about 2 to 6 hours, uniformly cooling the beads over a period of about 1 to 3 hours to 400°–420°C., and then cooling slowly or rapidly to room temperature, that is, cooling over a period of about 1 to 16 hours. This particular heat treatment when coupled with a most preferred initial glass composition, that is, 38 to 42 percent by weight $SiO_2$, 49 to 52 percent by weight $B_2O_3$ and 8 to 9 percent by weight $Na_2O$, provides for greater strength and thermal stability in beads having the above range of pore diameters. For example, such beads will have crush strengths of at least 15, and usually between 20 and 40 pounds per square inch gauge and will undergo less than a 25 percent volume shrinkage when exposed to 980°C. for 24 hours.

It should be apparent by regulating the times and temperatures of heat treatment as is described in the preferred embodiment above, that beads having pore diameters over the entire range of 50–2000, and in particular 50–1000 Angstrom units, could be produced with excellent strengths and thermal stabilities which is disclosed above.

With certain glass compositions, it is possible to phase separate the glass by carefully cooling the glass immediately after forming. For example, after the glass beads have been formed either by spheroidizing particles in a rotating tube furnace or by forming the beads directly from a melt, the hot beads can be passed directly to a furnace and slowly cooled down through the annealing range to effect a phase separation.

After the glass beads have been heat treated and phase separated, they are cooled and subjected to an extraction process. The extraction process involves a first water leach followed by a second acid leach. In the water leach, the glass beads are immersed in a water bath to leach out the soluble borate-rich phase. The temperature of the leaching water bath should be about 80°–100°C., with about 90°–1000°C. being preferred. As the temperature of the water bath falls below 80°C., there is less thorough extraction, and there must be a substantial increase in extraction time. In addition, the solubility of the borate-rich phase (alkali metal borate salts such as sodium pentaborate) increases with temperature. At a water temperature of 90°–100°C., the solubility of the borate-rich phase is very high. High solubility is important for recycling considerations which are discussed below. The time of leaching depends on the temperature of the bath and the size of the beads being treated. It has been found that a preferred temperature range of from about 90°–100°C., a leaching time of from about 2 to 24 hours, preferably about 6 to 8 hours, is suitable with beads having diameters of 2 to 4 millimeters. In addition, it has been found that greater crush strengths can be attained if the leaching is started cold since this has a tendency to reduce stress cracks, for example, less cracks will develop if the leaching is started at room temperature or slightly below and the temperature gradually raised to 90°–100°C. over the period of about 2 to 4 hours, than if leaching is conducted for the entire 6 to 8 hours at 90°–100°C.

The volume ratio of water to porous glass in the leaching should be about 2 to 8 volumes of water to 1 volume of glass. A low water:glass ratio slows the leaching process, while a higher ratio serves no particular advantage.

Preferably, it is desirable to leach with a metal borate solution such as sodium borate solution containing 100 to 450 grams of sodium borate per liter of water. This significantly reduces stress cracking, particularly with the high pore diameter beads, i.e., 600–1000 Angstroms. Such metal borate solutions can be derived from previously used leaching solutions.

After the water leaching step, the water solution containing the soluble phase (hereafter called the "leachate") is separated from the beads and transferred to a separator such as an evaporator. Evaporation would yield sodium borate and water vapor which could yield reusable distilled water. More economical procedures would be to cool down the solution so that it becomes supersaturated and part of the sodium borate could be crystallized and filtered out yielding sodium borate and low concentration sodium borate solution. The cooler may be an air or water-cooled heat exchanger or alternately be an evaporator-type cooler in which part of the water is evaporated by partial vacuum and the heat needed for this is drawn from the solution which necessarily cools down. A practical temperature to be reached is 45°C. based on using river water as cooling water. At this temperature approximately 50 percent of the sodium borate would crystallize out. The aqueous solution containing dissolved borate salts can be recycled for subsequent leaching as mentioned above. Optionally, after water leaching, the beads can be rinsed to scavenge more sodium borate before contamination with mineral acid in the subsequent acid leach.

After the water leach, the glass beads are then transferred while still wet to an acid bath for a second leaching. Useful acids are dilute solutions, typically in the range of from 0.1 to 3 Normal solutions, of mineral acids, such as hydrochloric, sulfuric and nitric acid, or organic acids such as oxalic acid. The concentration of the acid and the time and temperature of the acid leaching will depend on the rate and the amount of alkali to be removed from the silica-rich skeleton. Higher normality acids, that is, from 2 to 3 Normal, are used when the preceding phase separation has not been complete with considerable portions of alkali and borate remaining within the silica skeleton. However, when the preceding phase separation has been complete with most of the borate and alkali located in channels throughout the silica skeleton, leaching in lower normality acids, that is, 0.1 to 0.3 Normal, are satisfactory. In general, an acid leach at a temperature of from about 80°–100°C. for at least ½ hour, preferably about 2 to 6 hours, is satisfactory. It does not appear that the time and temperature of acid leaching have any measurable effect on the development of stress in the beads. Thus, long acid extractions at relatively high temperatures can be used. However, there appears to be no substantial advantage to acid leaching for a period of time greater than 6 hours.

The volume ratio acid to porous glass in the acid leaching should be about 1 to 8 volumes of acid to 1 volume of glass, and this ratio will vary somewhat with the normality of the acid being used. In general, the higher the normality of the acid, the lower the acid bead ratio. It should be noted that the leaching process as described above is for the most part based on laboratory scale procedures. Any commercial-sized production would incorporate large scale and continuous procedures such as continuous countercurrent extraction so as to obtain an efficient and economical process.

The two-step water-acid leach enables the production of high porosity volume and high pore sized beads which have higher surface areas and better crush strengths and thermal stabilities than comparable beads leached with only water or acid. Although not intended to be bound by any theory, the reason why the two-step water-acid leach may be so effective is because by first leaching with water, the extraction rate of borate-rich phase is slowed, and there is less extraction of the silica-rich phase. This produces less shrinkage of the silica phase, and the slower leaching rate gives the bead time to relieve some of the tension stresses developed, and leads to the production of a porous glass structure of high mechanical strength. The second leach with mineral acid removes a considerable amount of alkali metal oxide and borate from the silica skeleton not removed by the first water leach. Since alkali metal oxide and borate tend to reduce the softening temperature of the silica, their removal is believed to significantly improve the thermal stability of the resultantly leached porous glass structure.

Moreover, the two-step water-acid leach enables one to take the water leachate and recover the alkali metal borate salt and boric acid dissolved therein and recycle them for use in a subsequent glass melt. An acid leachate containing boric acid and alkali metal oxide could not be recycled as readily because of the contamination of the anion from the mineral acid. When common mineral acids, such as hydrochloric acid, sulfuric acid and nitric acid are used, chlorine, sulfur dioxide and various noxious nitrogen gases would be given off during the water removal and glass remelting steps. This, of course, would pose serious pollution problems.

By recycling the borate-rich phase over and over again, it is possible to make the porous articles of the invention containing greater than 96 percent by weight silica starting essentially with only sand. Little energy is required for melting, and there is no pollution or effluent problem due to the discharge of the borate salts. Further, raw material costs are significantly minimized.

After the acid treatment, the glass is washed to remove all traces of the soluble phase which are yet remaining and also any soluble impurities, such as iron, which may have been acted on by the acid. Washing may be accomplished by immersing the glass beads for about 1 to 4 hours in running tap, or preferably deionized water, in such a manner as to expose all the pores of the glass to the action of the water. A washing in deionized water is preferred because the resultant beads are found to have better thermal stability than beads washed with tap water. In other words, it has been found that beads which have been washed with deionized water undergo less shrinkage and surface area loss on long-term thermal exposure than do beads which have been washed with tap water. After washing, the beads are usually air dried in an air-circulating oven usually at 80°–100°C. to remove water and then dried at 760°C. for 1 hour to remove chemically bound water.

The microporous glass beads upon visual observation are seen to retain the original shape of the solid bead. Upon electron-microscopic observation, the beads can be seen to be extremely porous, having interconnected pores throughout the bead.

Upon elemental analysis, the beads have the following composition:

| Ingredient | Percent by Weight | |
|---|---|---|
| | Broad Range | Preferred Range |
| $SiO_2$ | at least 96 | 96 – 99 |
| $B_2O_3$ | less than 4 | 1 – 3 |
| alkali metal oxide | less than 0.05 | 0 – 0.03 |
| $Al_2O_3$ | less than 0.4 | 0 – 0.15* |

*Shows up as an impurity even though no $Al_2O_3$ added to the batch ingredients.

The microporous beads have high porosity and surface area as measured by nitrogen adsorption according to the method of Braunauer, Emmett and Teller using an automated commercial apparatus. For a discussion of this method, familiarly called the BET method, see S. Braunauer. *The Adsorption of Gases and Vapors*, Vol. 1, Princeton University Press, 1943. Accordingly, the pore volume is at least 0.35 cubic centimeters per gram, and often higher, from about 0.40 to 0.70 cubic centimeters per gram (cc/g), and the surface area of the porous beads is at least 25 square meters per gram, and often between 100 to 400 square meters per gram ($m^2/g$). It should be noted that the surface area will depend on the time and temperature of the phase separating heat treatment. High heat treatment temperatures such as are used to get large pore size diameters will produce lower surface areas on the average of 25 to 100 $m^2/g$. Lower heat treatment temperatures such as are employed to develop smaller pore diameters will produce greater surface areas, on the order of at least 100 $m^2/g$ and usually between 200 and 400 $m^2/g$.

Pore size diameter or pore size, as determined by electron microscopy, is on the order of 50 to 1000 Angstrom units, depending on the phase separating heat treatment as discussed above. It should be noted at this point that the pore size diameters are average values; the pore sizes being averaged over a fairly narrow distribution. It has been found for a given average pore size 50 to 60 percent of the pores are within ± 20 percent of the given value. For example, for an average pore size of 100 Angstroms, 50 to 60 percent of the pores will have a diameter within the range of 80–120 Angstroms.

Besides high porosity and surface area, the microporous glass beads of this invention have surprisingly good mechanical and thermal properties as measured by crush strength and thermal stability at 980°C.

The crush strength of the microporous glass beads of this invention is described as the air pressure in pounds per square inch gauge required to break the catalyst under specified test conditions.

Figure 4:
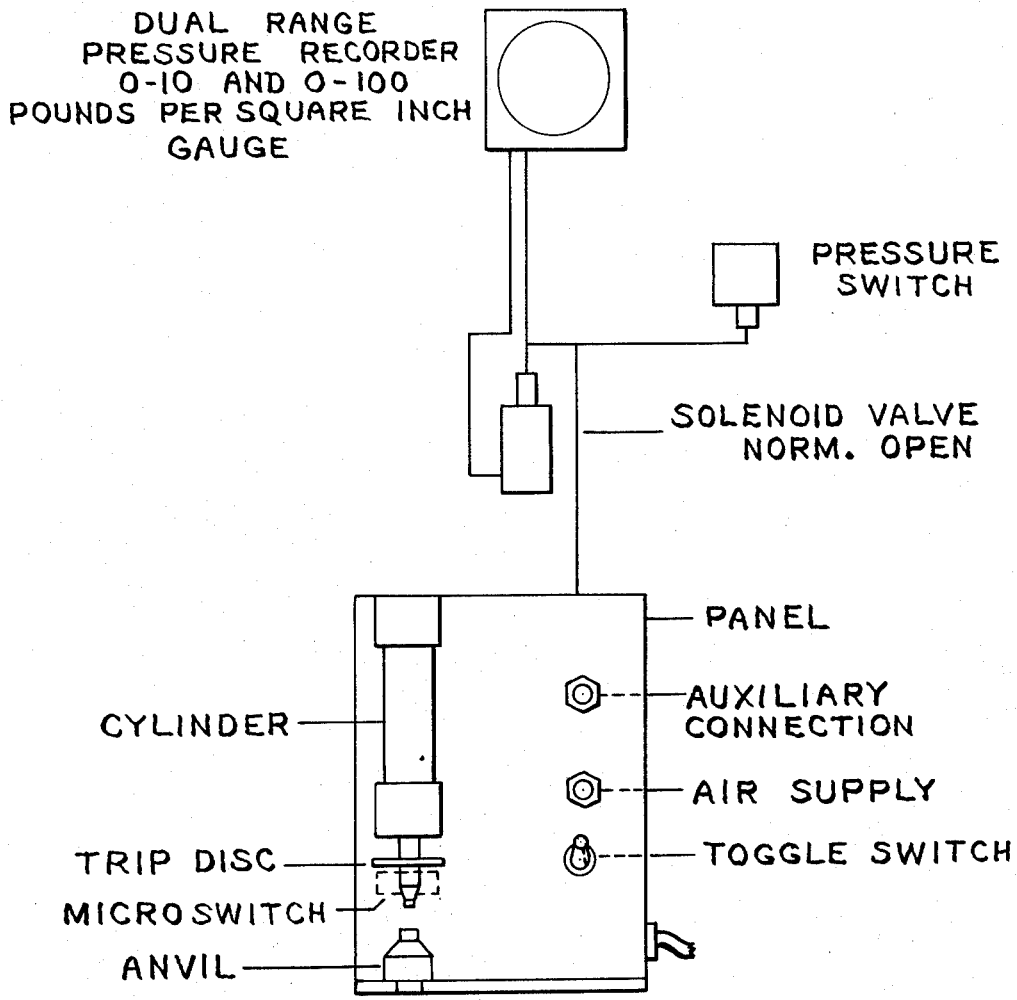
FIG. 4 shows a pneumatic pressure cylinder apparatus for measuring crush strengths of microporous glass beads of the invention.

Briefly, the test for crush strength involves taking a representative number of beads, preferably about 40 beads of approximately the same dimensions, and placing each bead in turn on the anvil of a pressure cylinder device, as shown in FIG. 4, and crushing the bead by an air-driven piston. The air pressure required is accurately gauged and converted to pounds per square inch gauge by means of a previously prepared calibration curve. The average value of the converted pressure readings are reported as the crush strength.

Figure 5:
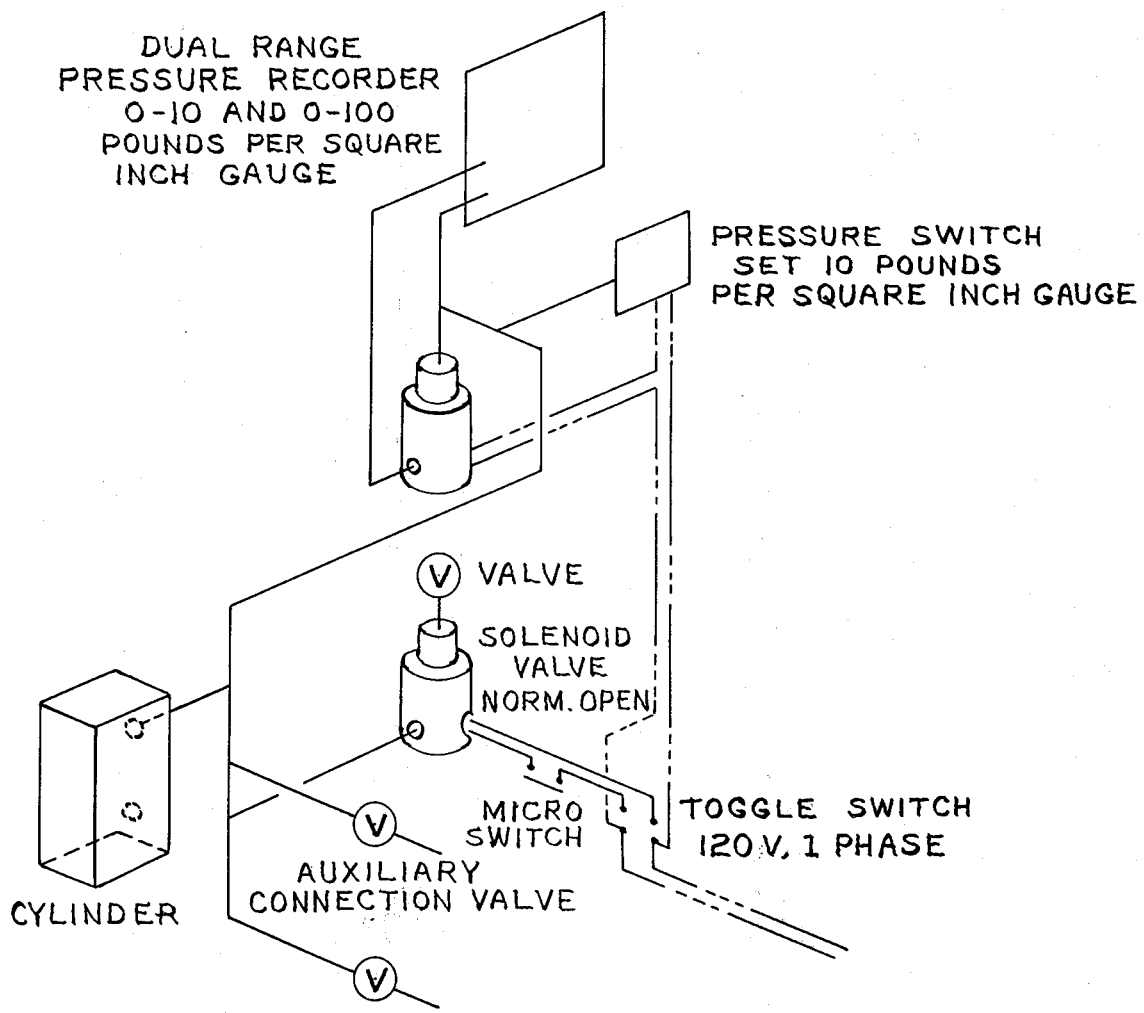
FIG. 5 is a schematic diagram of the pneumatic pressure cylinder apparatus shown in FIG. 4.

In measuring crush strengths, the following apparatus and technique should be used:

APPARATUS 1.
   a. Blending Apparatus — Any approved blending apparatus appropriate to the size of sample being mixed is satisfactory. A blender is recommended for samples of one gallon or less, a splitter for one to two gallon samples, and a drum roller for larger samples.
   b. Micrometer.
   c. Muffle Furnace, equipped with temperature-measuring and controlling devices.
   d. Pneumatic Pressure Cylinder Apparatus, conforming to the design of FIG. 4 and having electrical and air circuitry as indicated in FIG. 5.
   e. Tweezers.

SAMPLING

2. Sample the catalyst by any approved procedure to obtain a representative composite. Usually at least a one gallon sample is required for test normally applied to catalyst support.

PREPARATION OF SAMPLE 3.
   a. Prior to analysis mix the sample thoroughly by any approved procedure, and dry it in a muffle furnace for three hours at 250°F. unless other conditions are specified. Cool in a desiccator containing Drierite.
   b. Using a micrometer, measure the diameter of ten randomly chosen whole particles, and record the maximum, minimum and average values.
   c. Select a representative number of particles, preferably about 40, of approximately average diameter for testing.

PREPARATION OF APPARATUS 4.
   a. Turn on the main line power supply, and the main line air supply valve. Adjust the needle valve on the air supply line so that 8.6 seconds are required for the air pressure to reach 25 pounds, or 17.6 seconds to reach 50 pounds, as indicated on the recorder.
   b. Insert an anvil of the proper height in the opening in the bottom of the apparatus. Proper anvil height depends upon the diameter of the particles being tested, and must be such that the descending piston will trip the microswitch and release the air pressure, when the particle is crushed. If the correct anvil is used, no adjustment of the microswitch position should be necessary.
   c. If necessary, perform trial runs on several particles according to the procedure in Section 6 (b) and (c), to establish the requisite height of the anvil. If an anvil of the desired height is not obtainable, adjust the position of the microswitch in relation to the available anvil, so that the switch will be tripped when the particle is crushed.

CALIBRATION

5. Calibrate the air pressure recorder by any convenient procedure. The following procedure is recommended, but not mandatory. Insert a stout metal rod through the anvil opening, allowing the bottom tip of the rod to contact the pan of a platform balance. Align the rod so that the piston touches it. Turn on the power and air supply to the apparatus and apply selected air pressures to the piston. Record each applied pressure reading indicated on the recorder, and the corresponding weight reading indicated on the balance. Plot a calibration curve of recorder readings against observed weights.

PROCEDURE 6.
   a. Perform the measuring procedures in Section 3 (b) through (c) and prepare the apparatus as instructed in Section 4.
   b. Using tweezers, place a dried particle on the anvil. Lower the piston manually so that it touches the tweezers. Carefully remove the tweezers and allow the piston to rest on the particle.
   c. Turn on the toggle switch and allow the piston to crush the particle. Turn off the toggle switch immediately to vent the air flow, and manually raise the piston. Clean the anvil and piston with a brush before testing the next particle.

d. Process each of the particles in turn according to the procedure in Paragraphs (a) through (c).

CALCULATION 7.
a. Convert each of the air pressure readings (preferably 40 readings) on the recorder chart to pounds by means of the previously prepared calibration curve.
b. Average all the converted pressure readings and report the average value as the crush strength.

As measured by the above-described test, the crush strength of glass beads prepared according to this invention is at least 20 pounds per square inch gauge (psig) and are usually greater than 30 psig for beads having average pore diameters within the range of 50 to 200 Angstrom units. Wih beads prepared from non-optimized compositions and heat treatment, having larger average pore sizes, i.e., on the order of 200 to 1000 Angstrom units, crush strengths are somewhat lower, being on the order of 5 to 10 psig. However, as described above, large pore diameter beads, i.e., 600 to 1000 Angstroms, prepared with certain of the most preferred glass compositions and phase separated in the preferred manner can be produced having crush strengths of at least 15 psig, usually within the range of 20 to 40 psig.

A measure of the thermal stability of the beads can be attained by exposing previously dried beads to a temperature of 980°C. for 24 hours in a muffle furnace and measuring the loss of surface area and volume after the beads have cooled. The loss in volume of the beads is referred to as the volume shrinkage. Accordingly, the microporous glass beads of the invention having pore diameters on the order of 50 to 200 Angstroms, when subjected to the above treatment, lose less than 30 percent of their surface area and undergo less than 25 percent loss of volume (volume shrinkage). Larger pore size beads, i.e., 200 to 1000 Angstrom beads, prepared from non-optimized compositions and heat treatment, are not quite as thermally stable and when subjected to 760°C. for 24 hours, they undergo about 10 to 20 percent volume shrinkage. However, as mentioned above, with certain of the most preferred glass compositions and carefully controlled heat treating conditions, large pore diameter beads, i.e., those in the range of 600 to 1000 Angstroms, can be produced such that they undergo less than a 25 percent volume shrinkage when subjected to 980°C. for 24 hours.

The crush strength and thermal stabilities of the porous glass articles of the invention can be increased by slightly shrinking the beads. Since the shrinking would usually be conducted before the porous articles are used, for example, as a catalyst support, the shrinking will hereinafter be referred to as preshrinking.

The preshrinking operation is conducted by taking the porous articles, for example, in bead form, and briefly exposing them to an elevated temperature, i.e., a temperature of 400°–1100°C., and preferably a temperature of about 800°–1100°C. By suitably selecting temperature and time of exposure, the beads can be preshrunk to at least 70 percent, and preferably to greater than 90 percent, of the total shrinkage that they will undergo during their intended use as a catalyst support without excess loss of surface area or pore volume. In other words, after the beads have been suitably preshrunk, they will undergo no more than 10 percent volume shrinkage during the period of their intended use. The volume shrinkage is determined by measuring the loss of compacted bulk volume. Somewhat surprisingly, it has been found that the necessary preshrinkage can be accomplished by only a brief exposure at the required temperature, i.e, an exposure of up to 5 hours, and preferably less than 2 hours.

When porous glass particles are to be used as catalyst supports in higher temperature applications, for example, in a catalytic muffler which is exposed to temperatures of 800°–1100°C., the preshrinking should be conducted at the higher temperatures, that is, at about 900°–1100°C., in order to get the required dimensional stability at this high a use temperature. However, where lower temperature applications are envisioned, for example, in a catalytic cracker which operates at temperatures of 400°–500°C., a brief exposure within this temperature range will produce sufficient preshrinkage to make the particles dimensionally stable at this lower use temperature. Therefore, a preshrinkage temperature range of 400°–1100°C. is recommended, depending on the temperature that catalyst particles will be exposed to in use. An upper temperature limit of 1100°C. is recommended because at higher temperatures the micropores will tend to collapse, excessively reducing the surface area and pore volume. A lower temperature of 400°C. is recommended because at lower temperatures too little shrinkage occurs in a reasonable amount of time in order for the preshrinking operation to be practical.

Although not intending to be bound by any theory, the reason why it is believed that the microporous glass beads of this invention can be successfully preshrunk by only a brief exposure at high temperature is because of the particular physical properties of the beads. The microporous beads of this invention have very low alkali and borate content, which is due to the careful removal of residual soda and most of the borate from the silica skeleton, which creates tiny holes. Chemically bound water will come off at relatively low temperatures (e.g., 400°–760°C.) as evidenced by loss of weight, and will leave atomic-size or slightly larger holes. A brief exposure to medium or high temperatures will collapse these skeletal holes, resulting in a sharp initial linear shrinkage. After the initial shrinkage, additional shrinking will proceed much slower for the main larger pores. To collapse the main interconnecting pores, a very high temperature, somewhere near the annealing point of a 96 to 99 percent silica material, will be required. Thus, further heat treatment will result in only minimal shrinkage.

After the microporous beads have been preshrunk by a brief exposure to an elevated temperature, e.g., 800°–1100°C. for 1 hour, the physical properties of the beads have not changed appreciably. The volume shrinkage of the beads is about 5 to 20 percent based on the original bead volume, the beads have lost about 5 to 20 percent of their original pore volume and about 10 to 25 percent of their original surface area for beads having pore diameters of 50 to 200 Angstroms; for beads having pore diameters in the range of 600 to 1000 Angstroms, the loss of surface area is much greater being about 50 to 60 percent. The crush strength of the beads is increased to about 30 to 70 psig for beads having pore sizes of 50 to 200 Angstroms and to about 15 to 30 psig for beads having pore sizes in the range of 600 to 1000 Angstroms. The bulk density of the beads increased from about 0.60 to 0.70 grams per cubic centimeter (g/cc), and the average pore diameter is slightly increased.

The initial loss of surface area actually works as an advantage and provides for a more efficient use of catalysts. In the catalyst treating operation, the porous beads are impregnated with a catalyst solution and the solvent evaporated to deposit the catalyst in the pores of the porous glass support. The initial loss of surface area is due to the collapsing of the tiny holes in the silica skeleton. These tiny holes, although contributing to the surface area as measured by nitrogen adsorption, contribute little to resultant catalytic activity since they quickly collapse at elevated temperature. Thus, any catalyst which is present in these pores will either be encapsulated within the silica skeleton or at least be deactivated after a short period of high temperature catalytic operation. This, of course, results in a waste of expensive catalyst, e.g., noble metal. If, however, the microporous glass bead-catalyst supports are first subjected to a preshrinking heat treatment, the tiny micropores will be closed off to any catalyst solution and the catalyst will deposit only on the main interconnecting micropores.

The dimensional stability of the beads at elevated temperatures is significantly increased by preshrinking. Thus, beads which have been preshrunk in accordance with the practice of this invention are 3 to 4 times more dimensionally stable than non-shrunk beads as measured by comparing decrease in volume shrinkage at 980°C. for 24 hours.

As has been mentioned above, the porous glass articles of the invention, particularly in particle form, have utility as catalyst supports. Catalysts can be impregnated into the porous particles by soaking the particles in solutions of the catalyst or vapor depositing the catalyst in the pores of the particles. Thus, for example, to deposit refractory metal oxide such as tin oxide or noble metals such as platinum or palladium or metal oxides such as $TiO_2$, $V_2O_5$, $Cr_2O_3$, FeO, CoO, $NiO_2$ or CuO, a solution of the metal salt which can be decomposed by heat to the metal oxide or noble metal can be used to impregnate the porous particles. Examples of such salts are metal chlorides, nitrates, acetyl acetonates and carbonyls. In the case where it is desired to have the catalyst in the metallic state, the deposited metal oxide can be subsequently reduced by passing a stream of hydrogen gas over the support. Also, the porous glass beads could be first coated with a metal oxide such as $Al_2O_3$ and then subsequently coated with a noble metal catalyst such as platinum or palladium or mixtures of the two. This would be particularly desirable because, after high temperature, platinum and palladium show greater activity on an alumina support than a silica support.

Tin oxide ($SnO_2$) is a particularly desirable metal oxide to deposit on the porous glass articles of the invention. Tin oxide has been found to provide additional thermal stability to the porous glass bead. This is somewhat surprising in that other metal oxides such as $Al_2O_3$, $Cr_2O_3$ and $ZrO_2$ do not provide analogous results.

The amount of tin oxide deposited within the pores should be about 0.5 to 10 percent, preferably about 1 to 5 percent by weight. The amount of tin to be deposited can easily be determined by knowing the pore volume of the particles and by adjusting the concentration of the treating solution. Thus, for example, to deposit about 1.5 percent by weight SnO in the pores of a porous glass article having a pore volume of about 0.5 cc/g, the particles should be soaked for about 15 minutes in a solution containing about 150 grams of $SnCl_4$ .$5H_2O$ per liter of water. After soaking, the beads should be dried at 100°C. to remove water and then calcined to convert the tin chloride to tin oxide.

It should also be noted that in soaking the porous glass particles of the invention in metal salt solution, it is preferable that the particles be preshrunk before soaking. Preshrinking, as has been mentioned above, strengthens the beads. The beads in soaking quickly absorb solution due to capillary action, and entrap significant quantitites of air within the particles. This builds up pressures, and if great enough will fracture the beads if they are not strong enough.

EXAMPLE 1

The following example shows the preferred embodiment of the invention. In this example, porous glass beads were obtained by the method and apparatus described in aforementioned U.S. Pat. application Ser. No. 356,971, filed May 3, 1973, by E. J. Cone, entitled "Method and Apparatus for Producing Glass Beads". Briefly, to a furnace supported on a 20-foot tower charge 34 parts by weight silica, 79 parts by weight boric acid and 14.5 pounds of sodium carbonate. A glass of this charge had the following calculated composition:

| Component | Percent by Weight |
|---|---|
| $SiO_2$ | 41.0 |
| $B_2O_3$ | 49.6 |
| $Na_2O$ | 9.4 |

The mixture of glass batch ingredients was heated over a period of 12 hours from room temperature to a temperature of about 1260°C. under a nitrogen atmosphere. Temperature was maintained at 1260°C. for about 2 hours. At the end of this time, the viscosity of the glass in the furnace was about 8 poises. At the end of the heating period, the glass was permitted to flow out of the bottom of the furnace through a platinum nozzle. The nitrogen pressure in the furnace was increased to about 2 pounds per square inch and the molten glass jetted through the nozzle. The pressure on the glass as it was forceably discharged through the nozzle was due principally to the nitrogen and the hydrostatic head pressure of the glass. The height of the glass in the furnace was about 8 to 9 inches at the beginning of the flow and the head pressure would therefore be about three-fourths of a pound per square inch. The flow of nitrogen gas was carefully monitored into the furnace so as to maintain the nitrogen pressure on the glass of about 2 pounds per square inch. The nozzle orifice had a cross-sectional diameter of about 1/16 of an inch and a design as generally shown in FIG. 5 of the aforementioned patent application. As the glass was forceably discharged through this orifice at a rate of approximately 15 to 16 pounds of glass per hour, it formed a glass jet of approximately 3 feet in length, after which time the jet dissociated into particles which would fall in a downward course until they contacted a hydrocarbon quenching oil (Gulf 412 tempering oil). The particles spheroidized in their downward fall and contacted the quenching oil as hot spheres. The length of the fall of particles from the tip of the orifice to the quenching bath was about 8 feet.

It took about 2 hours to empty the tank of glass forming about 30 pounds of product glass beads. The beads were screened and about 95 percent of the beads were found to be spherical or slightly oblong, the rest being mainly in the form of strands, irregularly shaped beads with tails. The product beads which were formed had the following screen analysis (U. S. Standard Sieve):

| | |
|---|---|
| −10 mesh | 1.5 percent |
| +10 mesh | 5.6 percent |
| +8 mesh | 32.1 percent |
| +7 mesh | 41.8 percent |
| +6 mesh | 16.1 percent |
| +5 mesh | 2.7 percent |

The excess oil drained from the beads and the beads were then placed in a ceramic tray and inserted in an oven at 480°C. for 4 hours. The temperature of the oven was lowered to 400°C. over a period of 2 hours and then the oven was slowly cooled to room temperature over a period of about 3 hours. The beads were now separated into a silica-rich and borate-rich phase.

After heat treating, the beads were cooled to about room temperature and made ready for leaching.

Leaching was conducted with a five-liter quantity of beads. The five liters of beads were charged to a stainless steel leaching vessel being 20 centimeters in diameter and about 20 centimeters in height. The beads were contained between two horizontal screens, the lower screen being approximately 1.5 centimeters above the bottom of the vessel and the top screen approximately 2.5 centimeters below the top of the vessel. A liquid entrance was provided in the bottom of the vessel under the lower screen and a liquid exit in the side wall of the vessel slightly above the top screen. Between the exit and entrance of the vessel was positioned a pump and a temperature-control heater.

The leaching vessel was filled with approximately 4.5 liters of sodium borate solution left after the previous leaching operation. This solution at room temperature contained approximately 150 grams of sodium borate per liter of solution. The pump and heater were activated and the temperature in the vessel was raised to about 95°C. over a period of about 45 minutes. The 95°C. temperature was maintained for the remainder of the leaching operation. After the temperature reached 95°C., the pump was activated and additional sodium borate solution was added to the reactor at the rate of about 4 liters per hour. The pump circulates all the liquid in the reactor in about 1 to 2 minutes so that the liquid in the reactor is well mixed and of uniform concentration. The exit liquid is collected in a container for cooling and precipitation. The water leaching is carried out for about 8 hours after which time deionized water at the rate of 5 liters per hour is added to the reactor for 4 hours. Deionized water acts as a rinse. After the rinse, 0.3 Normal $HNO_3$ solution is added for the acid leaching at a rate of about 7.8 liters per hour for a period of about 6 hours. The acid leaching is followed by a final rinse in which deionized water is added to the reactor at the rate of about 5 liters per hour for a period of about 4 hours.

The beads were removed from the leaching vessel and then dried in an air-circulating oven at 85°C. to remove excess water. Physical properties of the beads were measured and are reported in Table I below.

Table I

| Physical Properties of Porous Glass Beads Prepared According to Example 1 | | |
|---|---|---|
| Elemental Analysis | Component | Percent by Weight |
| | $SiO_2$ | 98.6 |
| | $B_2O_3$ | 1.29 |
| | $Na_2O$ | 0.06 |
| | $Al_2O_3$ | 0.20* |
| Particle Size | 2 – 4 millimeters | |
| Compacted Bulk Density | 0.61 grams per cubic centimeter (g/cc) | |
| Pore Volume | 0.65 cubic centimeters per gram (cc/g) | |
| Average Pore Size | 120 Angstrom units (A) | |
| Surface Area | 198 square meters per gram ($m^2/g$) | |
| Crush Strength | 32 pounds per square inch gauge (psig) (average 20 samples) | |
| After 1 hour at 980°C. | | |
| Surface Area | 173 $m^2/g$ | |
| Loss of Surface Area | 12% | |
| Volume Shrinkage | 15% | |
| Pore Volume | 0.52 cc/g | |
| Compacted Bulk Density | 0.67 g/cc | |
| Crush Strength | 46 psig (average 20 samples) | |
| After 24 hours at 980°C. | | |
| Surface Area | 112 $m^2/g$ | |
| Loss of Surface Area (additional) | 35% | |
| Volume Shrinkage (additional) | 5.0% | |
| Pore Volume | 0.48 cc/g | |
| Crush Strength | 38 psig (average 20 samples) | |

*$Al_2O_3$ shows up in the analysis even though no $Al_2O_3$ in calculated glass composition, probably due to alumina impurity in $SiO_2$.

EXAMPLE 2

Example 1 was repeated with the exception that the glass composition was as follows:

| Ingredient | Percent by Weight |
|---|---|
| $SiO_2$ | 40 |
| $B_2O_3$ | 51.5 |
| $Na_2O$ | 8.5 |

Also, after beads were formed as described in Example 1, the beads were placed in a ceramic tray and placed in an oven at 580°C. for 4 hours. The temperature of the oven was then lowered to 400°C. over a period of 2 hours and the oven was then slowly cooled to room temperature over a period of 3 hours. The beads were leached and dried as described in Example 1 and had the following physical properties:

Table II

Physical Properties of Porous Glass Beads Prepared According to Example 2

| Elemental Analysis | Component | Percent by Weight |
|---|---|---|
| | $SiO_2$ | 98.7 |
| | $B_2O_3$ | 0.94 |
| | $Na_2O$ | 0.03 |
| | $Al_2O_3$ | 0.11* |
| Particle Size | 2 – 4 millimeters | |
| Compacted Bulk Density | 0.60 g/cc | |
| Pore Volume | 0.55 cc/g | |
| Average Pore Size | 800 – 900 Angstroms (A) | |
| Surface Area | 69 m²/g | |
| Crush Strength | 19 psig (average 10 samples) | |
| After 1 hour at 980°C. | | |
| Surface Area | 31 m²/g | |
| Loss of Surface Area | 55% | |
| Volume Shrinkage | 19% | |
| Pore Volume | 0.39 cc/g | |
| Compacted Bulk Density | 0.68 g/cc | |
| Crush Strength | 28 psig (average 10 samples) | |
| After 24 hours at 980°C. | | |
| Surface Area | 27 m²/g | |
| Loss of Surface Area (additional) | 13% | |
| Volume Shrinkage (additional) | 1% | |
| Pore Volume | 0.35 cc/g | |
| Crush Strength | 37 psig (average 10 samples) | |

*$Al_2O_3$ probably due to impurity in $SiO_2$.

EXAMPLE 3

A glass melt was obtained by thoroughly mixing and melting in a crucible at 1250°C. 1000 grams of silica, 2168 grams of boric acid and 470 grams of sodium carbonate. The melt was stirred and held for one hour at 1250°C. The temperature was then lowered to 1025°C. and the melt stirred and fined for an additional 3 hours. The calculated composition of the glass expressed as the oxides of the glass-making ingredients was as follows:

| Ingredient | Percent by Weight |
|---|---|
| $SiO_2$ | 40 |
| $B_2O_3$ | 49 |
| $Na_2O$ | 11 |

The molten glass was particulated to a frit by blowing a cold stream of air on the glass as it was poured from the crucible. The frit was sieved, and the fraction passing through a No. 5 U. S. standard sieve and not through a No. 10 U. S. standard sieve was collected. The larger fragments collected on a No. 5 sieve were passed through a jaw crusher for very large particles and a roll crusher for smaller particles. Again, the fraction between the No. 5 and No. 10 sieve were collected.

The particles collected from sieving (about 2 to 4 millimeters in size) were beaded to spherical shapes in an inclined rotating tube furnace Type 54233, manufactured by Lindbergh Company, a Division of Sola Basic Industries. The center portion of the tube furnace was at approximately 1050°C. To prevent sticking of the glass to the alumina tube, the glass particles were mixed with boron nitride in a ratio of one part by weight of boron nitride to 74 parts by weight of glass. The mixture was fed into the tube furnace at one end by means of a screw feeder. No sticking was encountered and better than 98 percent of the glass particles were beaded. After beading, the particles were again sieved and shaken to remove boron nitride and to separate the over and undersized beads.

The beads were then placed in a ceramic tray and heat treated at 480°C. for 5 hours. The beads were now separated into silica-rich and borate-rich phases.

After heat treating, the beads were cooled to about room temperature and charged to a reflux flask containing tap water at room temperature. The volume of water to beads was about 5 to 1. The temperature was raised over the period of 4 hours to 95°C., and this temperature maintained for 12 hours to complete leaching. After leaching the beads were separated from the leachate and the leachate passed through to a cold trap at room temperature where about 80 percent of the borate salts precipitated from solution. The salts were dried and recycled for use in a subsequent melt and the water solution containing the unprecipitated borate was recycled for use in subsequent leaching.

The beads which were separated from the leachate were then transferred to a reflux flask containing 0.3 Normal hydrochloric acid at 95°C. for acid leaching. The volume of acid to beads was about 5 to 1 and leaching was conducted for about 5 hours. After leaching the beads were removed from the acid bath and rinsed in deionized water to remove hydrochloric acid and any soluble phase remaining in the pores of the beads. The beads were then dried in an air-circulating oven at 85°C. to remove excess water. The physical properties of the beads were measured and are reported in Table III below:

Table III

Physical Properties of Porous Glass Beads Prepared According to Example 3

| Elemental Analysis | Component | Percent by Weight |
|---|---|---|

Table III-continued

Physical Properties of Porous Glass Beads Prepared According to Example 3

|  |  |  |
|---|---|---|
|  | $SiO_2$ | 98.18 |
|  | $B_2O_3$ | 1.62 |
|  | $Na_2O$ | 0.02 |
|  | $Al_2O_3$ | 0.18* |
| Particle Size |  | 2 – 4 millimeters |
| Compacted Bulk Density |  | 0.62 g/cc |
| Pore Volume |  | 0.59 cc/g |
| Average Pore Size |  | 100 – 120 A |
| Surface Area |  | 230 m²/g |
| Crush Strength |  | 37 psig (average 20 samples) |
| After 1 hour at 980°C. |  |  |
| Surface Area |  | 193 m²/g |
| Loss of Surface Area |  | 12% |
| Volume Shrinkage |  | 16% |
| Pore Volume |  | 0.48 cc/g |
| Compacted Bulk Density |  | 0.69 g/cc |
| Crush Strength |  | 57 psig (average 20 samples) |
| After 24 hours at 980°C. |  |  |
| Surface Area |  | 170 m²/g |
| Loss of Surface Area (additional) |  | 12% |
| Volume Shrinkage (additional) |  | 6% |
| Pore Volume |  | 0.40 cc/g |
| Crush Strength |  | 72 psig |

*$Al_2O_3$ shows up in the analysis even though no $Al_2O_3$ in calculated glass composition, probably due to alumina impurity in $SiO_2$.

EXAMPLES 4 TO 9

To show the effect that glass composition, particularly the $SiO_2$ and the $B_2O_3$ content, has on pore volumes and crush strengths of porous glass beads, the following examples are presented:

Porous glass beads having $SiO_2$ contents ranging from 30 to 70 percent, and $B_2O_3$ contents ranging from 20 to 60 percent, were prepared as generally described in the method of Example 3, that is, silica, boric acid, sodium carbonate and alumina were thoroughly mixed and melted for about 6 to 7 hours at temperatures between 1250° to 1450°C.; higher temperatures being used to melt the higher silica-containing glasses. The glass melt was fritted by pouring it into water, and the frit sieved to collect the desired size particles. The particles were spheroidized in an inclined rotating tube furnace as described in Example 3. The resultant beads were then heat treated, leached and rinsed as generally described in Example 3. The results of the experiments are shown in Table IV below.

EXAMPLES 10 to 13

To show the effect that alumina in the glass composition has on the surface area, thermal stability and leaching rate of porous glass beads of the invention, the following examples are presented. Leaching rate is determined by measuring the recession of the borate-rich phase as a function of leaching time. The recession is visible because of difference in refractive index between leached and unleached portions of the bead.

Glass compositions containing 4, 3, 1.5 and 0 percent by weight alumina were melted, particulated and beaded as generally described in the method of Example 3. The beads had a diameter of about 1 to 4 millimeters. The beads were then heat treated, leached and rinsed as generally described in Example 3. These variables and the leaching rate are reported in the table below. After drying, the beads were measured for surface area and thermal stability, and the results are reported in the table below.

Table IV

Effect of $SiO_2$ and $B_2O_3$ Content on Pore Volumes, Surface Areas and Crush Strengths of Porous Glass Beads

|  |  | Example No. | | | | | |
|---|---|---|---|---|---|---|---|
|  |  | 4 | 5 | 6 | 7 | 8 | 9 |
| Glass Composition | $SiO_2$ | 70 | 66.2 | 55.0 | 45.0 | 40.1 | 30.7 |
| (% by weight) | $B_2O_3$ | 22.8 | 24.5 | 33.5 | 43.3 | 50.1 | 59.1 |
|  | $Na_2O$ | 7.2 | 7.3 | 10.0 | 7.7 | 9.9 | 10.2 |
|  | $Al_2O_3$ | — | 2.0 | 1.5 | 4.0 | 0.14 | — |
| Bead Size Diameter (in millimeters) |  | 2–4 | 2–4 | 1–2 | 1–4 | 2–4 | 2–4 |
| Heat Treatment (time in hours/°C.) |  | 4/600 | 4/560 | 24/550 | 5/500 | 4/480 | 4/460 |
| Leaching (N HCl/time in hours/°C.) |  | 3/27/95 | 3/30/95 | 1/64/95 | 1/64/95 | 0.3/5/95 | 0.3/5/95 |
| Bead Composition | $SiO_2$ | 96.3 | 96.1 | 97.1 | 97.5 | 98.3 | Beads very |
| after leaching | $B_2O_3$ | 3.42 | 3.48 | 2.65 | 2.25 | 1.39 | weak and |
| (% by weight) | $Na_2O$ | 0.06 | 0.04 | 0.04 | 0.04 | 0.02 | broke up |
|  | $Al_2O_3$ | 0.15 | 0.31 | 0.25 | 0.25 | 0.24 | on leaching |
| Surface Area (m²/g) |  | 162 | 152 | 199 | 230 | 238 |  |
| Pore Volume (cc/g) |  | 0.12 | 0.15 | 0.29 | 0.47 | 0.58 |  |
| Crush Strength (psig) |  | 80 | 75 | 23 (crack) | 30 | 25 |  |
| 16-hour Exposure to 850°C.: |  |  |  |  |  |  |  |
| Surface Area (m²/g) |  | 80 | 93 | 145 | 152 | 228 |  |
| % Volume Shrinkage |  | 10 | 15 | 19 | 18 | 12 |  |

*Water leach for 16 hours at 95°C.

Table V

Effects of Al$_2$O$_3$ Content on Leaching Rate, Surface Area and Thermal Stability of Porous Glass Beads

| | | Example No. | | | |
|---|---|---|---|---|---|
| | | 10 | 11 | 12 | 13 |
| Composition | SiO$_2$ | 45 | 45 | 45 | 45 |
| | B$_2$O$_3$ | 42 | 42.5 | 45 | 46 |
| | Na$_2$O | 9 | 9.5 | 8.5 | 9 |
| | Al$_2$O$_3$ | 4 | 3 | 1.5 | 0 |
| Heat Treatment | | | | | |
| Temp. °C. | | 520 | 500 | 500 | 500 |
| Time in hours | | 24 | 32 | 8 | 8 |
| 1st Leach | | 0.1 N HCl | Water | Water | Water |
| (time in hours/temp. °C.) | | 24/95 | 16/95 | 16/95* | 16/95* |
| 2nd Leach | | | 1 N HCl | 0.1 N HCl | 0.1 N HCl |
| (time in hours/temp. °C.) | | — | 4/95 | 8/95 | 8/95 |
| Surface Area (m$^2$/g) | | 370 | 302 | 258 | 161 |
| Thermal Stability | | | | | |
| Surface Area (m$^2$/g) after exposure to 850°C. for 16 hours | | 199 | 193 | 179 | 122 |
| % Surface Area left after exposure | | 54 | 64 | 69 | 74 |
| Leaching Rate (mm/hours) | | 0.05 | 0.1 | 0.2 | 0.25 |

*Leach started in cold water at 20°C. and temperature slowly raised over 1½ hours to 95°C.

EXAMPLES 14 TO 16

The following examples show how beads, made with the preferred glass compositions of the invention, respond to varying times and temperatures of heat treatment. An analyzed glass composition containing 40.7% SiO$_2$, 48.9% B$_2$O$_3$, 9.9% Na$_2$O and 0.21% Al$_2$O$_3$ was prepared as generally described in the method of Example 3. The glass was particulated as generally described in Example 3 into beads having a diameter of about 2 to 4 millimeters. The beads were then heat treated for various times and temperatures as shown in Table VI below. After heat treating, the beads were leached first in tap water at 95°C. for 16 hours, followed by an acid leach in 0.3 N hydrochloric acid for 5 hours at 95°C. After the acid leach, the beads were rinsed with flowing deionized water. The beads were air dried and examined under a microscope for cracks and pore size. Crush strength measurements were taken, and the beads were then shrunk by a 2-hour exposure to 980°C. After shrinking, the crush strength was remeasured and the amount of shrinkage determined. The thermal stability of the preshrunk beads was then determined by exposing them to 980°C. for 16 hours and measuring the shrinkage and the loss of surface area. The results are presented in Table VI below.

Table VI

Effects of Time and Temperature of Heat Treatment on Crush Strength and Thermal Stability of Porous Glass Beads

| | Example No. | | |
|---|---|---|---|
| | 14 | 15 | 16 |
| Heat Treatment | 3/460 | 3/480 | 3/500 |
| (time in hours/ | 5/460 | 5/480 | 5/500 |
| temp.°C.) | 8/460 | 8/480 | 8/500 |
| | 16/460 | 16/480 | 16/500 |
| Cracks | 30 | 6 | 11 |
| (in 50 beads) | 12 | 6 | 18 |
| | 8 | 4 | 23 |
| | 3 | 40 | 25 |
| Crush Strength | 15.5 | 22.8 | 21 |
| (psig) | 15.1 | 24.0 | 16.5 |
| | 24.1 | 23.0 | 16.8 |
| | 22.4 | 10 | 11.0 |
| Preshrinking at 980°C. for 2 hours | | | |
| Shrinkage (volume %) | 16 | 16 | 16 |
| | 17 | 16 | 18 |
| | 16 | 17 | 29 |
| | 16 | 26 | 54 |

Table VI-continued

Effects of Time and Temperature of Heat Treatment on Crush Strength and Thermal Stability of Porous Glass Beads

| | Example No. | | |
|---|---|---|---|
| | 14 | 15 | 16 |
| Crush Strength (psig) | 11.0 | 34.5 | 32.1 |
| | 29.5 | 49.1 | 29 |
| | 41.7 | 48.4 | 52.0 |
| | 40.2 | 70 | 120 |
| High Temperature Exposure at 980°C. for 16 hours | | | |
| Shrinkage (volume %) | 8.3 | 9.5 | 9.5 |
| | 8.4 | 14 | 19.5 |
| | 9.5 | 15.5 | 35 |
| | 14.3 | 36.5 | 2.5 |
| Surface Area (m$^2$/g) | 173 | 167 | 126 |
| | 155 | 159 | 71 |
| | 158 | 64 | 0 |
| | 152 | 0 | 0 |

EXAMPLE 17

The following example shows the improvement in the physical properties of the glass articles of the invention by leaching first with water and then with acid, over similar glass articles leached only with acid or water.

A glass melt was obtained by thoroughly mixing and melting appropriate quantities of silica, boric acid, sodium carbonate and alumina to give a glass having the following composition on an oxide basis:

| Component | Percent by Weight |
|---|---|
| SiO$_2$ | 45.4 |
| B$_2$O$_3$ | 42.2 |
| Na$_2$O | 8.5 |
| Al$_2$O$_3$ | 3.8 |

The molten glass was particulated and beaded into spherical shape as described in Example 3 to give beads having a diameter of about 1 to 2 millimeters in size. The beads were heat treated at 500°C. for 64 hours. After heat treating, the beads were cooled to room temperature and leached with hot tap water at 85°C. for 24 hours. A portion of the beads were set aside, washed to remove any soluble phase remaining in the pores and then dried in an air-circulating oven at 85°C.

The composition, pore volume, surface area, crush strength and thermal stability of these beads were measured, and the results are reported in Table VII below.

The remaining portion of the beads were transferred to a reflux flask containing 1 Normal hydrochloric acid and leached at 95°C. for 24 hours. After acid leaching, the beads were removed from the acid and rinsed in water to remove hydrochloric acid and any soluble phase remaining in the pores of the beads. The beads were dried in an air-circulating oven at 85°C. The physical properties of these beads are reported in Table VII below.

A second glass composition, similar to the one described immediately above, and having the following composition:

| Component | Percent by Weight |
|---|---|
| $SiO_2$ | 45.0 |
| $B_2O_3$ | 43.3 |
| $Na_2O$ | 7.7 |
| $Al_2O_3$ | 4.0 | was melted, particulated and beaded as described generally above. The beads were heat treated at 500°C. for 48 hours, cooled to room temperature and then leached in 1 N HCl for 64 hours at 95°C. The beads were washed to remove hydrochloric acid and any soluble phase remaining in the pores. The physical properties of the beads are reported in Table VII below.

times listed in Table VIII below. The beads were then air dried and exposed to a temperature of 950°C. for 16 hours in a muffle furnace. The surface area was measured before and after the heat treatment and the results are presented in Table VIII below.

Table VIII

Experiments on Enhancing Thermal Stability by Using a Deionized Water Rinse

| Example No. | rinse | Thermal Stability 16-Hour Exposure at 950°C. Surface Area ($m^2/g$) before | after |
|---|---|---|---|
| 18 | Deionized $H_2O$ — 1 hour | 209 | 119 |
| 19 | Deionized $H_2O$ — 3 hours | 209 | 135 |
| 20 | Deionized $H_2O$ — 5 hours | 209 | 137 |
| 21 | Tap $H_2O$ — 1 hour | 209 | 62 |
| 22 | Tap $H_2O$ — 3 hours | 209 | 55 |
| 23 | Tap $H_2O$ — 5 hours | 209 | 57 |

EXAMPLES 24 to 28

The following examples show the preshrinking facet of this invention.

The following glass compositions were prepared generally according to the method of Example 3.

| Component | Example No. 24 | 25 | 26 | 27 | 28 |
|---|---|---|---|---|---|
| $SiO_2$ | 45.61 | 45.24 | 41.1 | 40.1 | 45.6 |
| $B_2O_3$ | 42.57 | 48.84 | 48.4 | 50.1 | 44.7 |
| $Al_2O_3$ | 3.22 | 0.22 | 0.15 | 0.14 | 0.14 |
| $Na_2O$ | 8.46 | 10.87 | 10.0 | 9.9 | 9.7 |

Table VII

Physical Properties of Porous Glass Beads Prepared According to Example 17

| Elemental Analysis of Porous Beads | Water Leach Component | % by Weight | Water Plus Acid Leach Component | % by Weight | Acid Leach Component | % by Weight |
|---|---|---|---|---|---|---|
| | $SiO_2$ | 91.7 | $SiO_2$ | 96.6 | $SiO_2$ | 96.5 |
| | $B_2O_3$ | 3.7 | $B_2O_3$ | 3.16 | $B_2O_3$ | 3.25 |
| | $Na_2O$ | 0.85 | $Na_2O$ | 0.01 | $Na_2O$ | 0.05 |
| | $Al_2O_3$ | 3.8 | $Al_2O_3$ | 0.29 | $Al_2O_3$ | 0.25 |
| Particle Size | 1 – 2 mm | | 1 – 2 mm | | 1 – 2 mm | |
| Pore Volume | 0.38 cc/g | | 0.45 cc/g | | 0.47 cc/g | |
| Surface Area | 234 $m^2/g$ | | 253 $m^2/g$ | | 215 $m^2/g$ | |
| Surface Area After 16 Hours at 850°C. | 124 $m^2/g$ | | 173 $m^2/g$ | | 110 $m^2/g$ | |
| Loss of Surface Area | 47% | | 31.6% | | 49% | |
| Crush Strength | 22 psig | | 24 psig | | 16 psig | |

EXAMPLES 18 to 23

The following examples show how the rinsing of the glass beads after acid leaching with deionized water enhances the thermal stability of the beads, as compared by rinsing with tap water.

The glass beads were prepared by the method generally described in Example 3. The analyzed glass composition was 46.1% $SiO_2$, 45.8% $B_2O_3$, and 8.0% $Na_2O$. Glass beads having a diameter of about 1 to 2 millimeters were prepared by fritting and beading and the beads heat treated at 480°C. for 5 hours. The heat treated beads were cooled and leached first in hot tap water at 95°C. for 16 hours and then in 0.3 N HCl at 95°C. for 6 hours. The beads were then rinsed in either flowing tap water or deionized water at 95°C. for the The glass was particulated, sized and beaded as generally described in Example 3. The beads were then heat treated at various times and temperatures to cause phase separation. After heat treating, the beads were cooled to room temperature and leached using hot tap water. The beads were then leached with hot hydrochloric acid, after which they were rinsed in deionized water to remove hydrochloric acid and any soluble phase remaining in the pores of the beads. The beads were then air dried at 95°C. The various heat treatment and leaching cycles are reported immediately below as are the physical properties of the various beads.

| Example No. | Heat Treatment time in hours | Temp. °C | Water Leach time in hours | Temp. °C | Acid Leach N of HCl/time in hours/temp. °C. | Bead Size Diameter (mm) | Pore Volume (cc/g) | Surface Area (m²/g) | Crush Strength (psig) |
|---|---|---|---|---|---|---|---|---|---|
| 24 | 8 | 500 | 16 | 95 | 0.1/16/95 | 2 – 4 | 0.45 | 326 | 19 |
| 25 | 64 | 500 | 24 | 95 | 0.1/7/95 | 2 – 4 | 0.45 | 246 | 21 |
| 26 | 5 | 480 | 16 | 95 | 0.3/5/95 | 5 | 0.60 | 252 | 25 |
| 27 | 5 | 480 | 16 | 95 | 0.3/5/95 | 4 | 0.58 | 223 | 37.7 |
| 28 | 5 | 480 | 16 | 95 | 0.3/5/95 | 4 | 0.47 | 179 | 38.7 |

The microporous glass beads were then shrunk by exposing them to elevated temperatures for various periods of time as reported in Table IX below. The linear shrinkage is reported in Table IX and was determined by measuring the change in diameter of the bead with a quartz pushrod dilatometer with a dial gauge indicator. The linear shrinkage is the decrease in diameter of the bead and the percent linear shrinkage is equal to the loss of diameter ($\Delta$ D) divided by the original diameter (D) of the bead (% linear shrinkage = ($\Delta$ D/D)100). The crush strength, surface area and percentage loss of surface area of the shrunken beads are also reported in Table IX below.

The beads were then dried at 100°C. to remove water and then calcined at 700°C. for 2 hours to convert the aluminum nitrate to $Al_2O_3$. Upon analysis, the beads were found to have about 1 percent $Al_2O_3$ deposited in the pores. The $Al_2O_3$ coated beads could then be used as a cracking catalyst.

EXAMPLES 30 to 34

In an analogous manner to the method of Example 29, porous glass beads such as described in Example 3 were treated with $Cr_2O_3$, $ZrO_2$, $SnO_2$, mixed $Cr_2O_3$-CuO and mixed platinum-palladium, respectively. The treating solutions were:

Table IX

Shrinkage Properties of Microporous Glass Beads of Examples 24 to 28

| Example No. | Successive Heat Treatment Temp.(°C.) | Time (hrs.) | Linear Shrinkage $\Delta D/D$ (%) additional | total | Loss of Surface Area $\Delta S/S$ (%) additional | total | Crush Strength (psig) |
|---|---|---|---|---|---|---|---|
| 24 | 510 | 1 | 3.7 | 3.7 | | | |
|  | 510 | 19 | 0.5 | 4.2 | | | |
|  | 850 | 1 | 1.7 | 5.9 | | | |
|  | 850 | 21 | 1.1 | 7.0 | | | |
| 25 | 850 | 1 | 3.1 | 3.1 | 5 | 5 | |
|  | 850 | 5 | 0.5 | 3.6 | | | |
|  | 850 | 16 | | | 1 | 16 | |
|  | 850 | 65 | 2.0 | 5.6 | | | |
| 26 | 760 | 1 | 2.9 | 2.9 | | | |
|  | 760 | 5.5 | 0.3 | 3.2 | | | |
|  | 980 | 1 | 1.6 | 4.8 | | | |
|  | 980 | 17 | 2.9 | 7.7 | | | |
|  | 980 | 20 | 0.2 | 7.9 | | | |
| 27 | 760 | 1 | 2.8 | 2.8 | 0.9 | 0.9 | 41.6 |
|  | 980 | 1 | 5.2 | 8.0 | 15.7 | 16.6 | 56.8 |
|  | 980 | 20 | 1.8 | 9.8 | 8.5 | 25.1 | 72.0 |
| 28 | 980 | 1 | 6.85 | 6.85 | | | |
|  | 980 | 2.5 | 0.60 | 7.45 | | | |
|  | 980 | 18.5 | 1.90 | 9.35 | | | |
|  | 980 | 22.5 | 0.25 | 9.60 | | | |
| 28 | 760 | 1 | 4.5 | 4.5 | | | |
|  | 760 | 2 | 0.1 | 4.6 | | | |
|  | 760 | 4 | 0.2 | 4.8 | | | |
|  | 980 | 1 | 1.4 | 6.2 | | | |
|  | 980 | 2 | 0.6 | 6.8 | | | |
|  | 980 | 19 | 1.7 | 8.5 | | | |
|  | 980 | 22 | 0.1 | 8.6 | | | |

Figure 3:
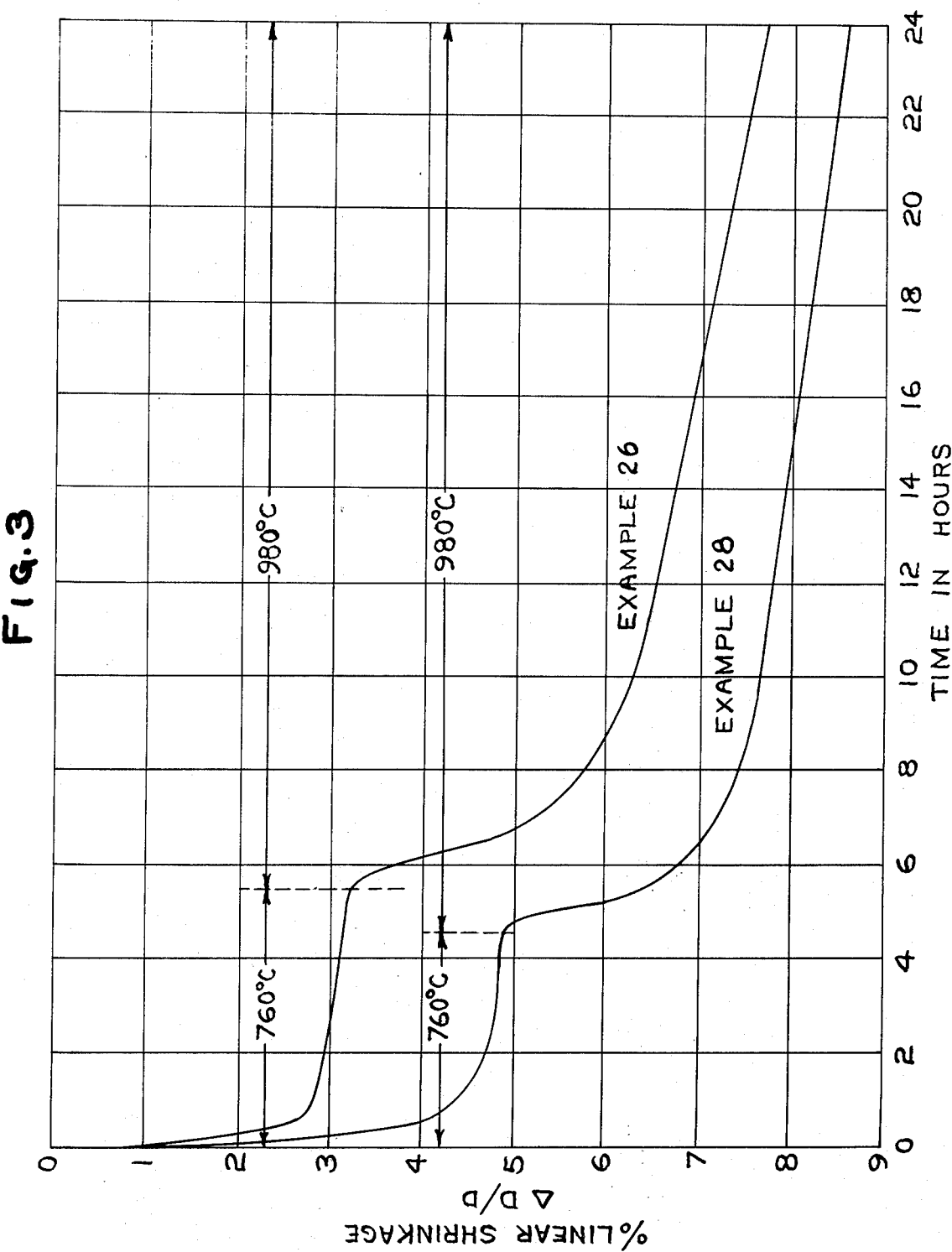
FIG. 3 are graphs showing the percent linear shrinkage, as a function of time, for various samples of microporous glass beads prepared in accordance with the invention and exposed to temperatures of 760°-980°C. for the times shown on the graphs.

FIG. 3 shows graphically the percentage of the linear shrinkage as a function of time for Examples 26 and 28.

The following examples show the depositing of various metal oxides and noble metals onto porous glass beads of the invention.

EXAMPLE 29

One hundred and sixty (160) grams of $Al(NO_3)_3 \cdot 9H_2O$ dissolved in one liter of water was used to soak about 500 grams of beads prepared as described in Example 3. The beads had a pore volume of about 0.54 cc/g, and soaking was conducted for about 15 minutes after which time the beads were vacuum dried on a Buckner Funnel to remove excess soaking solution.

| Ex. No. | Treating Solution |
|---|---|
| 30 | 125 grams of $CrCl_3 \cdot 6H_2O$/liter of water |
| 31 | 150 grams of $ZrOCl_2 \cdot 8H_2O$/liter of water |
| 32 | 67 grams of $CuCl_2$ and 150 grams of $CrCl_3 \cdot 6H_2O$/2 liters of water |
| 33 | 6.7 grams of $PtCl_4$ and 5.9 grams of $PdCl_2$/2 liters of water |
| 34 | 147 grams of $SnCl_4 \cdot 5H_2O$/liter of water |

The beads had, respectively, 1.5% $Cr_2O_3$, 3.0% $ZrO_2$, 3% $CuO$-$Cr_2O_3$ in a 1:1 weight ratio, 0.2% Pt-Pd in a 5:2 weight ratio, and 1.5% $SnO_2$ deposited within their pores. The $Cr_2O_3$ coated porous glass beads could be used as hydrocracking catalyst. The mixed $CuO$-$Cr_2O_3$ catalyst was used as an oxidation catalyst, and the mixed Pt-Pd supported catalyst was used as an oxidation catalyst and for hydrocracking.

EXAMPLE 35

To show the thermal stabilizing effect of depositing tin oxide on the porous glass articles of the invention, the following experiment was conducted:

A glass composition containing:

| Ingredient | Percent by Weight |
|---|---|
| $SiO_2$ | 41.1 |
| $B_2O_3$ | 47.4 |
| $Na_2O$ | 10 |
| $Al_2O_3$ | 1.5 | was melted, particulated, sized and beaded as generally described in Example 3. The beads which had a diameter of about ⅛ inch were heat treated at 480°C. for 5 hours, cooled and leached first in hot water for 16 hours at 95°C. and then in hot acid 0.3 N HCl at 95°C. for 5 hours. The beads were rinsed in deionized water and air dried. The beads were preshrunk by a 2-hour exposure to 980°C. The beads had the following physical properties:

| Composition: | Component | Percent by Weight |
|---|---|---|
| | $SiO_2$ | 98.3 |
| | $B_2O_3$ | 1.39 |
| | $Na_2O$ | 0.025 |
| | $Al_2O_3$ | 0.30 |
| Surface Area: | | 200 m²/g |

The beads were then separated into portions and soaked with $SnCl_4 \cdot 5H_2O$, $Al(NO_3)_3 \cdot 9H_2O$, $CrCl_3 \cdot 6H_2O$ and $ZrOCl_2 \cdot 8H_2O$ solutions, respectively, as generally described above in Examples 29, 30, 31 and 34. For control, one portion of the beads was untreated. The beads had, respectively, 1.5% $SnO_2$, 1% $Al_2O_3$, 1.5% $Cr_2O_3$ and 3% $ZrO_2$ deposited in their pores. The beads were then tested for thermal stability by observing the percent shrinkage during a prolonged exposure to 980°C. The results are shown below.

| Metal Oxide Deposited in Pores of Beads | Thermal Exposure Time (hours) | Temp. (°C.) | Percent Shrinkage by Volume |
|---|---|---|---|
| Nothing | 16 | 980 | 10 |
| $SnO_2$ | 20 | 980 | 4 |
| $Al_2O_3$ | 20 | 980 | 16 |
| $Cr_2O_3$ | 20 | 980 | 10 |
| $ZrO_2$ | 20 | 980 | 12 |

Although the porous glass disclosed above has been described for use as catalytic supports principally in bead form, it should be apparent that the porous glass of the present invention can be utilized in a great number of other uses and forms.

Because of its large surface area and controllable pore diameter, the porous glass of the present invention is a highly desirable filtering material. The surface of glass has a high affinity for certain molecules, thus making it possible to separate not only on the basis of molecular size, but also on molecular type. Thus, the porous glass of the present invention can be used as is or treated with a material such as an organo silane and be used as a support for chromatographic separations, that is, for separations which depend on selective adsorption and also for separations based on stearic exclusion chromatography.

In addition, the porous glass of the present invention is thermally, chemically and mechanically stable, making it a regenerative-type filter. Such stability makes the porous glass of the present invention a particularly efficient filter for cigarette smoke and for filtering toxic gases which pollute the air, that is, combustion engine exhaust from automobiles, trucks, etc. and noxious gases from industrial stacks and house chimneys. Also, porous glass of the present invention can be effective in adsorbing evaporating solvent from paints and glues and is effective for purifying and drying gases. Other applications would include purifying liquids such as whiskey, purifying air in enclosed systems, that is, submarines, and high altitude aircraft.

The porous glass of the present invention can be provided in the form of a membrane, and when so provided, the porous glass provides an effective diffusion barrier for use in ultrafiltration and reverse osmosis.

In contrast to organic polymer membranes used in commercial reverse osmosis and ultrafiltration applications and which are sensitive to many variables in the system, porous glass offers expanded capabilities for use in systems employing high temperature and low pH which are generally not compatible with organic polymer membranes. Also, porous glass could be used with high solids and microbe containing systems which cannot generally be employed with organic polymer membranes. In addition, porous glass can be more easily cleaned and sterilized than can organic polymer membranes.

The porous glass of the present invention can be used as an ion exchange medium in applications such as softening and desalting water. The water-softening process involves the exchange of sodium for calcium ions in water. This can readily be accomplished by placing large concentrations of sodium ions on the surface of the porous glass and using the material to exchange sodium for calcium ions. Besides water softening, the porous glass of the invention can be used for desalinization which involves removing cations as well as anions from water. The surface of the porous glass of the present invention can be conditioned to act as an exchange as well as an adsorber of both cations and anions. In addition, it is believed possible that the porous glass of the present invention can be used to improve the efficiency of water purification and the purification of polluted waste water before discharging in a stream or river.

The porous glass of the present invention, because it has such outstanding thermal stability, makes it unique among filtering or ion exchange material. It is possible to regenerate the porous glass after filtering or ion exchanging simply by heating the porous glass to an elevated temperature. Materials trapped within the porous glass will usually burn off before the porous glass which is essentially 98 percent silica is softened. The fact that porous glass can be regenerated would prove useful where weight and bulk have to be kept to a minimum, for example, spacecraft and submarines. A porous glass filter could be periodically regenerated and replace a much larger filter, where elimination of periodic replacing of filters would mean a gain in convenience. Regeneration requires only the flick of a switch which can be easily automated.

The porous glass of the present invention can also be used in granular and fiber form as a filler and reinforcement material in a variety of resinous materials, both thermoplastic and thermosetting such as polystyrene, polyethylene, polypropylene, polyurethanes, polyesters and epoxies. The uniqueness of the porous glass of the present invention as a filler and reinforcement material is its high porosity. It would have less than one-half the bulk density of the most comparable inorganic fillers and the pores would give a much improved adhesion to the material that it is reinforcing. The improved adhesion due to the porosity should definitely increase the strength of the glass-plastic composite.

The porous glass of the present invention could also be used in such diverse applications as the removal of oil slicks from sea water. The problem of removal of oil slicks which form on sea water due to accidental spillage or other reasons has not been solved. An ideal technique or a material for removing the oil spillage has not been found. The porous glass of the present invention could be made in fiber or granular form with large pore size diameters. The surface of the porous glass could be made hydrophobic by methylating the surface with a material such as dichlorodimethylsilane. This will allow the porous glass of the present invention to float on the surface of the water due to its non-wetting character. Porous glass could then be spread over the oil slick and the oil on the surface of the water will enter and fill the pores of the glass due to capillary action. The porous glass could then be ignited, the oil from within the pores burned off. The porous glass would act as a wick, capillary action will continue to feed oil into the glass as burning occurs. Burning will be possible due to the insulation provided by the porous glass.

We claim:

1. A glass composition which, upon being heat treated, separates into a borate-rich phase and a silica-rich phase, comprising:

| Component | Percent by Weight |
|---|---|
| $SiO_2$ | 38 – 42 |
| $B_2O_3$ | 49 – 52 |
| $R_2O$ (where R is sodium or potassium) | 8 – 10 |
| $Al_2O_3$ | 0 – 4. |

* * * * *